Oct. 27, 1931.  F. W. YOST  1,829,576
MECHANICAL OVERLOAD RELEASE MECHANISM
Filed June 19, 1929   2 Sheets-Sheet 1
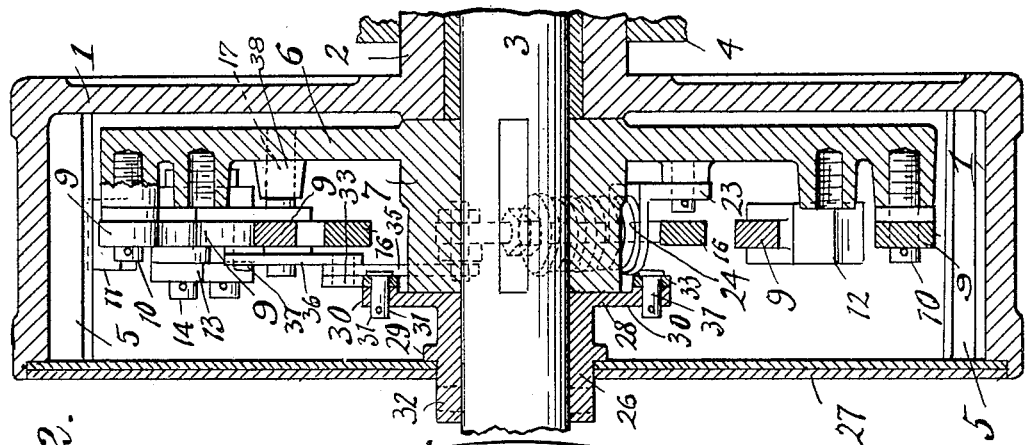
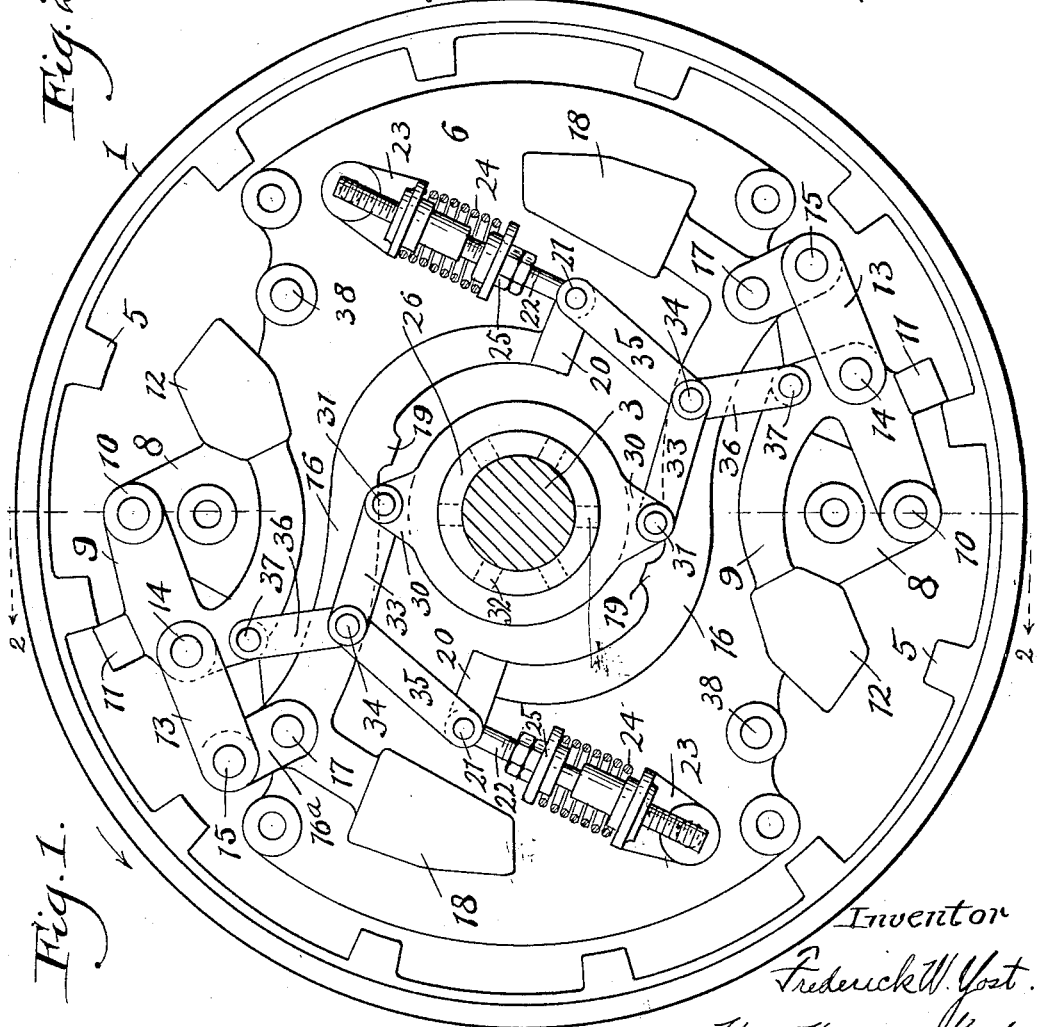
Inventor
Frederick W. Yost.
Kwis Hudson & Kent
attys.

Inventor
Frederick W. Yost
Kwis Hudson + Kent
attys.

Patented Oct. 27, 1931

1,829,576

UNITED STATES PATENT OFFICE

FREDERICK W. YOST, OF CLEVELAND, OHIO

MECHANICAL OVERLOAD RELEASE MECHANISM

Application filed June 19, 1929. Serial No. 372,173.

This invention relates to a combined coupling and overload release mechanism forming the driving connection between a driving member and a driven member.

An object of the invention is to provide a mechanism of this character which is so constructed that when a predetermined overload is imposed on the driven member the release mechanism will be automatically tripped and the driving member disconnected or uncoupled from the driven member, thereby preventing breakage of any of the parts.

Another object is to provide a mechanism of this character which may be adjusted for relatively small overloads.

A further object is to provide, when two or more tripping elements are employed in the mechanism, means to insure synchronous action of the elements at all times and prevent premature tripping of one element under a fractional load because of some error in adjusting the elements.

Another object is to provide a mechanism of this character wherein the releasing means is held in the released position irrespective of the different speeds of the driving member.

A further object is to provide a mechanism of this character which may be readily reset to the driving position after the same has been tripped to released position because of an overload upon the driven member.

Additional objects and advantages resulting from the details of construction and the arrangement of the parts will appear more fully hereinafter as the description of a specific embodiment of the invention proceeds.

In the accompanying drawings, disclosing an embodiment of the invention,

Figure 1 is an end elevational view of the coupling and overload release mechanism, the cover plate of the mechanism being omitted so as to show the operating parts thereof, which parts are in the intermediate or partly released position.

Fig. 2 is a transverse section through the mechanism taken substantially on line 2—2 of Fig. 1, looking in the direction of the arrows.

Figure 3:
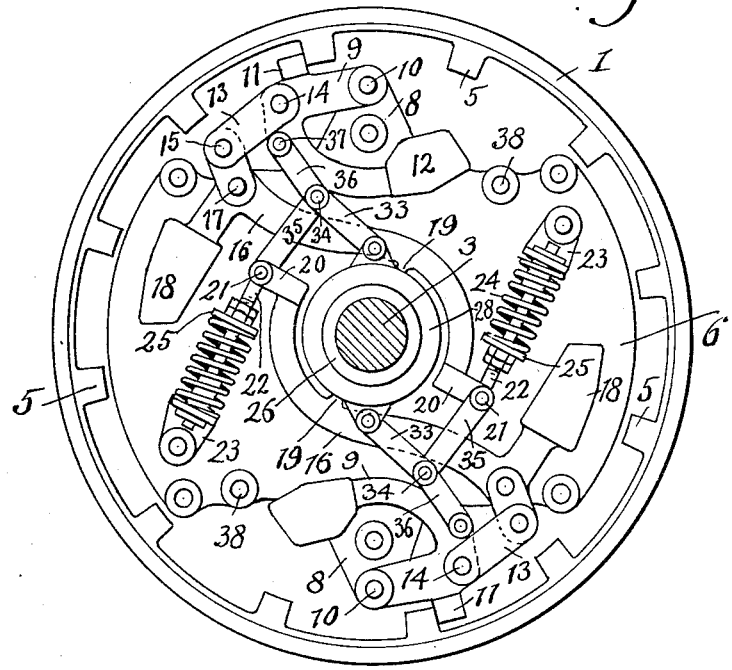
Fig. 3 is a view similar to Fig. 1, but showing the parts in the fully engaged or driving position.

It is not thought necessary to disclose herein a view showing a specific application of the mechanism to a driving and driven member further than what is shown in Fig. 2 of the drawings and brought out in the following description.

Referring to Fig. 2, it will be seen that in this illustration the drum 1 is the driving member and that it is provided with a hub 2 loosely mounted for independent rotation upon a shaft 3 which, in the present instance, is the driven member. A pulley, gear or sprocket 4 may be keyed on the hub 2 of the drum 1 to form the driving connection between a source of driving power and the drum 1, such pulley, gear or sprocket being fragmentarily shown in Fig. 2. Of course, the mechanism might be employed as a coupling for two aligned and abutting shafts, one of which is the driving shaft and the other of which is the driven shaft, and in such case the hub 2 of the drum 1 would be keyed to one of the shafts, while that part of the mechanism later to be described would be keyed to the other of the shafts  It is, of course, obvious that in either of these forms the drum 1 may be the driven member and the other part of the mechanism could be associated with the driving member.

The drum 1 is provided on the inside of its rim with a series of circumferentially spaced inwardly extending teeth 5, which teeth constitute driving elements since, in the arrangement shown, the drum is to rotate in a counterclockwise direction. The mechanism forming the driving connection between the drum and the shaft 3, as well as the overload release mechanism, includes as a part thereof a spider 6 arranged within the drum and having a hub 7 keyed to the driven shaft 3, as clearly shown in Fig. 2. The spider 6 is of general circular configuration, the diameter of which is somewhat less than the diameter between the inner ends of the teeth 5 of the drum, although diametrically opposite portions of the spider adjacent the circumference thereof are cut away to provide radially extending diametrically opposite securing or attaching portions 8 as well as clearance space for parts of the mechanism later to be described.

Levers 9, in the nature of bell crank levers, are pivoted upon fixed fulcrum pins 10 carried by the portions 8 of the spider 6, as clearly shown in the drawings, the levers each being so fulcrumed at the end of a corresponding arm thereof. The arms of the levers 9, which are fulcrumed upon the spider, are each provided with an integral lug or pawl 11 adapted to coact with the teeth 5 of the drum when the parts are in the fully engaged or driving position, as will be more fully explained hereinafter. The other arm of each of the levers 9 is provided at its end with a counterbalance portion or weight 12, the purpose of which also will be more fully explained hereinafter.

Links 13 are pivoted at one end to the levers 9 upon floating pivot pins 14 carried by the levers at the junction of the two arms thereof and at their other end upon floating pivot pins 15 to integral extensions 16a of levers 16, so as to form toggle joint linkages, the extensible ends of such linkages being at the point of the pivotal connection of the links 13 with the levers 16. These latter levers are likewise somewhat in the nature of bell crank levers and are pivoted upon the spider 6 at the junction of the two arms of the levers by means of fixed pivot pins 17 carried by the spider, the integral extensions 16a projecting outwardly from such point of pivotal connection. Corresponding arms of the two levers 16 are provided at their outer ends with counterbalance weights 18 while the other arms of the levers have arcuate portions provided with stop lugs 19 and, additionally, they have at their ends integral outwardly extending bracket arms 20. The bracket arms 20 are each connected to a compression spring assembly by means of a pin 21 carried by one end of a threaded bolt 22 which bolt is slidably mounted adjacent its other end in a bracket 23 pivotally secured to the spider 6. A spring 24 surrounds each bolt 22 and abuts at one end against a head carried by the bracket 23 and at its other end against an adjustable nut 25, whereby adjustment of the spring pressure required to balance any predetermined overload may be obtained.

The mechanism thus far described constitutes a complete coupling and overload release mechanism and the description immediately following covers that part of the mechanism for resetting the coupling and release mechanism into driving position after the same has been released because of an overload.

This part of the mechanism comprises a resetting collar 26 loosely mounted on the shaft 3 and extending through an opening provided in a suitable cover or end plate 27 secured to the open side of the drum 1. The inner end of the resetting collar 26 is provided with an annular flange 28 abutting the hub 7 of the spider so as to maintain the resetting collar against axial movement in one direction, while an annular rib 29 on the collar, but spaced from the flange 28, engages the inner side of the cover or end plate 27 and maintains the collar against axial movement in the opposite direction.

The annular flange 28 is provided with diametrically opposed outwardly extending projections 30, the outer end of each of which has an opening for the reception of a pivot pin 31 for a purpose later to be described. The portion of the resetting collar which projects outside of the cover plate is provided with a series of holes 32 for the purpose of receiving a spanner wrench or other suitable tool when it is desired to reset the mechanism.

Links 33 are pivotally mounted at their inner ends upon the pins 31 carried by the portions 30 of the flange 28 of the resetting collar and each is pivotally connected at its outer end by means of a pin 34 to the adjacent ends of a pair of links 35 and 36, respectively. The links 35 are in turn pivotally connected at their outer ends to the bolts 22 of the compression spring assemblies previously described and to the brackets 20 of the levers 16 by means of the pins 21. The outer ends of the links 36 are in turn pivotally connected to the levers 9 by means of pins 37 carried by such levers.

It will be seen from the foregoing description that the device set forth comprises two symmetrically arranged coupling and tripping mechanisms cross-connected and adjustable so as to be simultaneously tripped under various predetermined overloads or simultaneously reset into driving position after such tripping has taken place.

Although the proper balance between the relatively movable members usually necessitates the use of two tripping mechanisms which are symmetrical and work in unison and in which the lugs or pawls 11 are both in driving engagement or are both released at any one instant, it is quite apparent that for low speeds a single tripping mechanism may be used, while for large loads three or more synchronized tripping mechanisms may be required, therefore it is not intended to limit the present invention to the use of the two tripping mechanisms herein disclosed.

Figure 4:
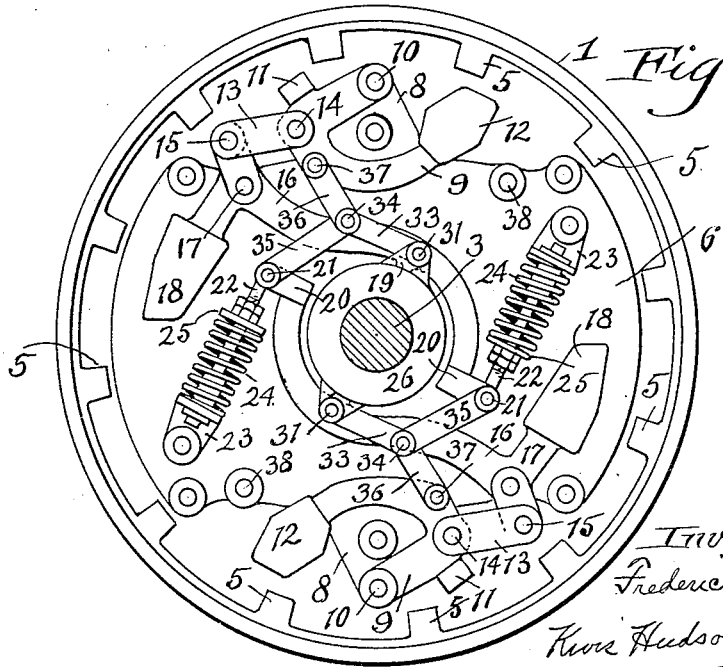
Fig. 4 is likewise a view similar to Fig 1 but showing the parts in the fully released or uncoupled position.

The operation of the mechanism, together with a number of the advantages derived from the construction thereof, will now be set forth: Referring to Fig. 3 wherein the parts are shown in the engaged or driving position, it will be seen that with the drum 1 rotating in a counter-clockwise direction it in turn, is driving the shaft 3 in the same direction through the mechanism heretofore described. As soon as a predetermined overload is transmitted from the teeth 5 of the drum to the lugs or pawls 11 of the levers 9 (determined by the adjustment of the springs 24) such overload by the action of the transmitted pressure between the teeth 5 and the lugs 11 will cause the levers 9 to turn on the fixed fulcrum pins 10 in a counter-clockwise direction and thus straighten out the toggle linkages, (the links 13 and the levers 9). The floating pivot pins 14 are moved to the straight center line extending through the pins 15 and 10 (see Fig. 1) which movement causes the floating pivot pins 15 to move away from the fixed pins 10 and in turn rocks the levers 16 about their pivots 17 in a counter-clockwise direction. Of course, this movement of the levers 16 is transmitted to the brackets 20 at the ends of the long arms of the levers, so that the motion of these brackets compresses the springs 24. It will be seen, from an inspection of Fig. 1, that when the toggle linkage has reached the straight line position and the levers 16 have attained their maximum counter-clockwise movement and the springs 24 have been compressed to their maximum, the lugs or pawls 11 are still in partial contact with the teeth 5 of the drum. The further pressure of the teeth 5 upon the lugs or pawls 11 results in moving the pins 14 a substantial distance on the other side of the straight center line through pins 10 and 15 before the tips of the lugs or pawls 11 clear the tips of the teeth 5 (see Fig. 4). During this movement of the toggle linkage the pins 15 move toward the fixed pins 10, while the levers 16 are turned in a clockwise direction about the pins 17, such movement of the levers in turn permitting the springs 24 to expand and lengthen. As soon as the lugs or pawls 11 are entirely clear of the teeth 5 the pressure of the springs 24 will continue the clockwise movement of the levers 16 until the toggle linkage is fully collapsed into the released position as shown in Fig. 4. Once this position has been attained the pressure exerted by the springs 24 will maintain the toggle linkage in the collapsed position and will hold the stop lugs 19 of the levers 16 in contact with the hub 7 of the spider 6.

As previously pointed out, the counterbalance weights 12 are integral parts of the levers 9 while the counterbalance weights 18 are integral parts of the levers 16, and the weights 12 counterbalance the weight of the levers 9, together with the weight of the link parts directly attached thereto, while the weights 18 counterbalance the weight of the levers 16 and such parts as are directly attached to those levers. These weights form differential counterbalances which pull against each other under the influence of centrifugal force and once they have been correctly balanced against each other for any given speed, they will be correctly balanced for all other speeds. This differential action of these counterbalances neutralizes the effect of centrifugal force which otherwise would tend to increase or decrease the tripping resistance of the lugs or pawls 11 at a given spring pressure and, in addition, when spider 6 is the driving member, the differential counterbalances neutralize the effect of centrifugal force at high speeds which tends to throw the released toggle linkage back into the driving position. This arrangement insures a constant tripping load for any given spring pressure irrespective of variations in speed.

The parts having been moved to the fully released position, and it being desired to reset the same to engaged or driving position, a spanner wrench or other suitable tool is engaged with the openings 32 in the resetting collar and such collar is turned in a counter-clockwise direction, which moves the links 33 tangentially with respect to the flange 28 toward the rim of the drum with the result that the pins 34 are moved outwardly and the pins 21 and 37 to which the links 35 and 36 are connected are spread or moved apart from the shortest center distance they have occupied when the parts were in the released position. This spreading action results in the movement of the pins 21 in relation to the pins 37, the pins 37 serving as fulcrums since they are restrained by the spring pressure multiplied by the total leverage effective at the pins 14 while the pins 21 are restrained only by the pressure of the springs 24. The movement of the pins 21 acting against the resistance of the acting fulcrum pins 37 compresses the springs 24 and at the same time turns the levers 16 around the fulcrum pins 17 in a counter-clockwise direction. This last mentioned movement of the levers 16 pulls the toggle linkages (links 13 and levers 9) into a straight line position, as shown in Fig. 1.

Although the pins 37 have served as fulcrums for the movement of the pins 21, these pins 37 have also partaken of a movement because they must necessarily follow the movement of the pins 14 carried by the levers 9 to the straight line position of the toggle linkages. The toggle linkages being in the straight line position, the pressure on the spanner wrench is still momentarily maintained although there is now no resistance to the direct outward movement of the pins 37 because the toggle linkages are on dead center. The fulcrums about which the parts move now automatically change to the pins 31 which have reached the end of their movement with the result that the pressure of springs 24 acting through pins 21 and links 35 will swing the links 33 about the pins 31 now serving as fulcrums and thus move links 36 and pins 37 outwardly until the toggle linkages and the lugs 11 are replaced in the driving position, as shown in Fig. 3. When the parts are in this driving position the stop lugs 19 are held in contact with the hub 7 of the spider 6, which engagement in turn maintains the toggle links in constant angular relation to each other and thereby insures a fixed total leverage from the springs 24 to the lugs 11. As soon as the stop lugs 19 have engaged the hub of the spider the reaction of the springs 24 upon the spanner wrench, through its operative connection with the resetting collar, ceases and the same may be removed by the operator.

The resetting steps may be stated to comprise two phases, namely the one in which the spanner wrench stroke compresses the springs and moves the toggle linkages to dead center, and the one in which the spring pressure automatically moves the toggle linkages into the driving position. The obtainance of this second phase of the resetting operation is brought about by the relationship between the property of the resetting linkages and the property of the floating levers, whereby the fulcrums automatically shift from one pin to another upon the completion of the first phase of the operation.

It will also be seen from the description of the construction of the resetting mechanism, together with that relating to its operation, that the linkages thereof cross-connect the two symmetrical sets of tripping mechanisms in that one resetting linkage is connected by the pin 21 to the levers 16 and spring 24 of one tripping mechanism and by the pin 37 to the toggle linkage of the other tripping mechanism. Thus each tripping mechanism is connected to the other mechanism through the medium of the resetting linkages at both the light load end thereof adjacent the spring 24 and at the heavy load end adjacent the toggle linkage. This arrangement prevents the premature tripping of one tripping mechanism, due to some accidental or abnormal condition, at a load under the predetermined total load.

If the total leverage from the spring 24 to the lug 11 were constant through the whole range of tripping movement, a relatively great overload would be required to complete the tripping action, but the mechanism is so arranged that although the springs are compressed and the spring load increased materially by the tripping action, the leverage is increased more rapidly than the consequent compression of the spring increases the spring pressure. This is brought about by the use of a toggle joint linkage so arranged that the leverage increases rapidly as the linkage approaches a straight line position.

The advantageous result accomplished by this arrangement is that the overload release may be adjusted for relatively small amounts of overload since any overload which starts the tripping action will complete the same. When the angular position of the links of the toggle joint linkage is reversed and such linkage is blocked by the lug 19, a locking action is secured which assures the holding of the parts in the released position by the action of the spring 24 against the stop lug 19. The differential counterbalances comprise another important feature of the invention since they prevent at varying speeds any change in spring pressure values effective on the teeth 5 of the drum and also effective in holding the toggle linkage in the released position. The cross-connection of the two tripping mechanisms by the resetting linkages provide a still further important feature which should be emphasized herein since such cross-connection insures synchronous action of the two tripping mechanisms at all times and prevents premature tripping of one side under a fractional load, due to some error such as adjusting one spring for a smaller load than the other spring.

It might be well to repeat at this time that the resetting mechanism is simple and easily operated and that only a slight effort is required upon the spanner wrench since it is only necessary to compress the springs at a time when there is a favorable leverage between the springs and the wrench. Since this movement of the spanner wrench places the toggle links in a position of minimum resetting resistance, the springs will automatically reset the toggle linkages and the lugs 11 into the engaged position.

It should be noted that when the parts are in the driving position the stop lugs 19 serve as limit stops to maintain a constant angularity between the links of the toggle linkages and thus a constant fixed ratio of the tripping load on the lugs 11 to the pressure of the springs 24. When the parts are in the fully released position, as shown in Fig. 4, the pressure of the springs 24 holds the stop lugs 19 against the hub of the spider and prevents the toggle linkages from returning to the engaged or driving position except through the operation of the resetting linkages. The stop lugs 19 also serve as a fixed gauging point for adjusting the springs 24 for a predetermined overload whether the toggle linkages are in the driving position or in the released position, and irrespective of whether the lugs 11 are in contact with certain of the teeth 5 of the drum or happen to be intermediate a pair of such teeth.

Furthermore, the stop lugs 19 when in engagement with the hub of the spider enable the front faces of the lugs 11 to engage the teeth 5 of the drum to drive the latter in a counter-clockwise direction without the tripping function. This reversal of the operation is important since it may be advantageously used when repairing or adjusting the driven machine or when some temporary loading condition causes the driven machine to overrun and reverses the flow of power.

Another advantageous detail of construction resides in the fact that the spider 6 is made symmetrical about the center line through pins 10 and shaft 3 so that the whole assembly of links and levers may be reversed to the opposite hand for clockwise rotation, in which position pins 38 carried by the spider perform the same function as do the pins 17 in the arrangement shown and described.

It should be noted that the pressure of the springs 24 may be adjusted readily by means of the adjustable nuts 25 thereby providing a simple and expeditious arrangement for setting the mechanism to the desired amount of overload.

Although a preferred embodiment of the invention has been illustrated and described herein, it should be understood that the same is susceptible of various modifications and adaptations within the scope of the appended claims and that such embodiment has been shown and described merely by way of illustration.

Having thus described my invention, what I claim is:

1. In a mechanism of the character described, a driving member, a driven member, teeth associated with one of said members, a plurality of toggle linkages associated with the other of said members and having overload means cooperating with said teeth, and means operatively cross-connecting said toggle linkages.

2. In a mechanism of the character described, a driving member, a driven member, teeth associated with one of said members, a toggle linkage fulcrumed on the other of said members and having a pawl associated therewith adapted to cooperate with said teeth to effect a driving relationship therebetween, and a yieldingly controlled lever fulcrumed on said last named member and pivotally connected with said linkage, the fulcrum points of the toggle and lever and the pivotal connections between the links of the toggle and between the toggle and lever being arranged with the links of the toggle out of alignment during driving operation of the mechanism so that a predetermined pressure between the teeth and pawl straightens the toggle and increases the leverage thereof.

3. In a mechanism of the character described, a driving member, a driven member, teeth associated with one of said members, a toggle linkage fulcrumed on the other of said members and having a pawl associated therewith adapted to cooperate with said teeth to effect a driving relationship therebetween, and a yieldingly controlled lever fulcrumed on said last named member and pivotally connected with the extensible end of said toggle linkage, the fulcrum points of the toggle linkage and the lever and the pivotal connections between the links of the toggle and between the toggle and the lever being so arranged with the links of the toggle out of alignment during driving operation of the mechanism that a predetermined pressure between the pawl and the teeth straightens the toggle and thus increases the leverage thereof to swing the lever.

4. In a mechanism of the character described, a driving member, a driven member, teeth associated with one of said members, a plurality of toggle linkages fulcrumed on the other of said members and each having a pawl associated therewith adapted to cooperate with said teeth to effect a driving relationship therebetween, and yieldingly controlled levers fulcrumed on said last named member and pivotally connected with said linkage, the fulcrum points of said toggle linkages and said levers and the pivotal connections between the links of the toggles and between the toggle linkages and the lever being so arranged that a predetermined pressure between the teeth and the pawls straightens the toggle linkages and increases the leverage of the same to swing the levers against the yielding pressure controlling their movement.

5. In a mechanism of the character described, a driving member, a driven member, teeth associated with one of said members, a plurality of symmetrically arranged toggle linkages fulcrumed on the other of said members and having pawls associated therewith adapted to cooperate with said teeth to effect a driving relationship therebetween, and yieldingly controlled levers fulcrumed on said last named member and pivotally connected with the extensible ends of said toggle linkages.

6. In a mechanism of the character described, a driving member, a driven member, teeth associated with one of said members, a plurality of toggle linkages fulcrumed on the other of said members and having pawls associated therewith adapted to cooperate with said teeth to effect a driving relationship therebetween, levers fulcrumed on said last named member and pivotally connected to said toggle linkages, and means connecting each toggle linkage to a lever which is pivotally connected to a different toggle linkage.

7. In a mechanism of the character described, a driving member, a driven member, teeth associated with one of said members, a pair of toggle linkages symmetrically arranged and fulcrumed upon the other of said members and having pawls associated therewith adapted to cooperate with said teeth to effect a driving relationship therebetween, levers fulcrumed on said last named member and pivotally connected to said toggle linkages, and means for effecting a connection between each of said levers and the toggle linkage other than the linkage to which it is pivotally connected.

8. In a mechanism of the character described, a driving member, a driven member, teeth associated with one of said members, a toggle linkage fulcrumed to the other of said members and having a pawl associated therewith adapted to cooperate with said teeth, a lever fulcrumed upon said last named member and pivotally connected to said toggle linkage, a second pivotally connected toggle linkage and lever symmetrically arranged with respect to the first toggle linkage and lever, the said second named toggle linkage and the said second named lever each being fulcrumed upon said last named member, and means connecting the toggle linkage of one set with the lever of the other set whereby synchronous operation of the two sets of linkages and levers is provided.

9. In a mechanism of the character described, a driving member, a driven member, teeth associated with one of said members, a plurality of toggle linkages fulcrumed upon the other of said members, said linkages having pawls adapted to cooperate with said teeth to effect a driving relationship therebetween, levers fulcrumed on said last named member and pivotally connected to the extensible end of said toggle linkages, said toggle linkages and said levers being symmetrically arranged in sets, and means connecting the toggle linkage of one set with the lever of another set.

10. In a mechanism of the character described, a driving member, a driven member, teeth associated with one of said members, a pair of toggle linkages fulcrumed upon the other of said members and having pawls associated therewith adapted to cooperate with said teeth to effect a driving relationship therebetween, levers fulcrumed upon said last named member and pivotally connected with the extensible ends of said toggle linkages, said toggle linkages and the levers connected thereto forming a pair of sets of symmetrically arranged linkages and levers, and means connecting the linkage of one set with the lever of the other set.

11. In a mechanism of the character described, a driving member, a driven member, teeth associated with one of said members, a plurality of toggle linkages fulcrumed upon the other of said members and having pawls associated therewith adapted to cooperate with said teeth to effect a driving relationship therebetween, levers fulcrumed upon said last named member and pivotally connected to the extensible ends of said toggle linkages, means for yieldingly resisting movement of said levers, said toggle linkages and said levers being arranged in sets, and means connecting the linkage of one set to the lever of another set.

12. In a mechanism of the character described, a driving member, a driven member, teeth associated with one of said members, a plurality of toggle linkages fulcrumed upon the other of said members and having pawls associated therewith adapted to cooperate with said teeth, levers fulcrumed upon said last named member and pivotally connected to the extensible ends of said toggle linkages, yielding means associated with each of said levers for controlling the movement thereof, said linkages and said levers being symmetrically arranged in sets, and means connecting the linkage of one set with the lever of another set.

13. In a mechanism of the character described, a driving member, a driven member, teeth associated with one of said members, a toggle linkage fulcrumed on the other of said members and having a pawl associated therewith adapted to cooperate with said teeth, a lever fulcrumed on said last named member and pivotally connected with the extensible end of said toggle linkage, and means associated with said lever for yieldingly resisting movement thereof, the fulcrum points of said linkage and said lever and the points of pivotal connection between the links of said linkage and between said linkage and said lever being so arranged with the links of the toggle out of alignment during driving operation of the mechanism that a predetermined pressure between said teeth and said pawl straightens said linkage and moves said lever against the resistance of said means, which straightening increases the leverage of said linkage proportionately more than the movement of said lever increases resistance of said means.

14. In a mechanism of the character described, a driving member, a driven member, teeth associated with one of said members, a toggle linkage fixedly fulcrumed at one end to the other of said members and having a pawl associated therewith adapted to cooperate with said teeth, a lever fixedly fulcrumed adjacent one of its ends upon said last named member and pivotally connected adjacent such end to the extensible end of said linkage, and yielding means associated with the other end of said lever to resist movement thereof, whereby when a predetermined pressure is created between said pawl and said teeth said toggle linkage will be straightened and said lever moved against the resistance of said means, which straightening increases the leverage of said linkage proportionately more than the movement of said lever increases the resistance of said means.

15. In a mechanism of the character described, a driving member, a driven member, teeth associated with one of said members, a toggle linkage fixedly fulcrumed upon the other of said members and having a pawl adapted to cooperate with said teeth, a lever fixedly fulcrumed upon the other of said members and pivotally connected to the extensible end of said toggle linkage, means to limit movement of said lever in one direction, and means to yieldingly resist movement of said lever in the opposite direction.

16. In a mechanism of the character described, a driving member, a driven member, teeth associated with one of said members, a toggle linkage fixedly fulcrumed at one end to the other of said members and having a pawl adapted to cooperate with said teeth, a lever fixedly fulcrumed adjacent one of its ends upon said last named member and pivotally connected adjacent such end to the extensible end of the toggle linkage, means associated with the other end of said lever for yieldingly resisting movement thereof in one direction, and means associated with said lever for limiting movement thereof in the opposite direction.

17. In a mechanism of the character described, a driving member, a driven member, teeth associated with one of said members, a toggle linkage fulcrumed upon the other of said members and having a pawl associated therewith adapted to cooperate with said teeth, a lever fulcrumed upon said last named member and pivotally connected to said toggle linkage, and means for differentially counterbalancing said toggle linkage and said lever.

18. In a mechanism of the character described, a driving member, a driven member, teeth associated with one of said members, a toggle linkage fixedly fulcrumed at one of its ends upon the other of said members and having a pawl associated therewith adapted to cooperate with said teeth, a lever fixedly fulcrumed upon said last named member and pivotally connected to the extensible end of said toggle linkage, means associated with said lever for yieldingly controlling the movement thereof, and means for differentially counterbalancing said toggle linkage and said lever.

19. In a mechanism of the character described, a driving member, a driven member, teeth associated with one of said members, a toggle linkage fixedly fulcrumed adjacent one of its ends upon the other of said members and having a pawl associated therewith adapted to cooperate with said teeth, a lever fixedly fulcrumed adjacent one of its ends upon said last named member and pivotally connected adjacent such end to the extensible end of the toggle linkage, means associated with the other end of said lever for yieldingly controlling the movement thereof, and a differential counterbalance including means associated with the toggle linkage and means associated with said lever adjacent the fulcrumed end thereof.

20. In a mechanism of the character described, a driving member, a driven member, teeth associated with one of said members, a toggle linkage fixedly fulcrumed adjacent one of its ends upon the other of said members and having a pawl associated therewith adapted to cooperate with said teeth, a lever fixedly fulcrumed adjacent one of its ends upon said last named member and pivotally connected adjacent such end with the extensible end of said toggle linkage, means associated with said lever adjacent its other end for yieldingly resisting movement thereof in one direction, means associated with said lever for limiting movement thereof in the opposite direction, and means for differentially counter-balancing said linkage and said lever.

21. In a mechanism of the character described, a driving member, a driven member, teeth associated with one of said members, a plurality of toggle linkages fixedly fulcrumed at one of their ends upon the other of said members and having pawls associated therewith adapted to cooperate with said teeth, levers fixedly fulcrumed upon said last named member and pivotally connected with the extensible ends of said linkages, means associated with said levers for yieldingly resisting movement thereof in one direction, and means for limiting movement thereof in the opposite direction.

22. In a mechanism of the character described, a driving member, a driven member, teeth associated with one of said members, a plurality of toggle linkages fixedly fulcrumed adjacent one of their ends upon the other of said members and having pawls associated therewith and adapted to cooperate with said teeth, levers fixedly fulcrumed adjacent one of their ends upon said last named member and pivotally connected adjacent such end to the extensible ends of said toggle linkages, means associated with said levers adjacent the opposite ends thereof for yieldingly resisting movement of the levers in one direction, and means for limiting movement of the levers in the opposite direction.

23. In a mechanism of the character described, a driving member, a driven member, teeth associated with one of said members, toggle linkages fixedly fulcrumed adjacent one of their ends upon the other of said members and having pawls associated therewith adapted to cooperate with said teeth, said linkages being symmetrically arranged, levers fixedly fulcrumed upon said last named member and pivotally connected to the extensible ends of said linkages, means for yieldingly resisting movement of said levers in one direction, means for limiting movement of said levers in the opposite direction, and differential counterbalancing means associated with said linkages and said levers.

24. In a mechanism of the character described, a driving member, a driven member, teeth associated with one of said members, a toggle linkage fulcrumed upon the other of said members and having a pawl associated therewith adapted to cooperate with said teeth, a lever fulcrumed upon said last named member and pivotally connected to the extensible end of said linkage, means for yieldingly controlling movement of said lever, a resetting linkage associated with one of said members and connected with said toggle linkage whereby said pawl may be moved into cooperating relationship with one of said teeth.

25. In a mechanism of the character described, a driving member, a driven member, teeth associated with one of said members, toggle linkages fulcrumed upon the other of said members and having pawls associated therewith adapted to cooperate with said teeth, levers fulcrumed upon said last named member and pivotally connected to the extensible ends of said linkages, and means associated with one of said members and having an operative connection with said toggle linkages, whereby the pawls associated with such linkages may be moved into cooperating relationship with said teeth.

26. In a mechanism of the character described, a driving member, a driven member, teeth associated with one of said members, a pair of toggle linkages fixedly fulcrumed adjacent one of their ends upon the other of said members and having pawls associated therewith adapted to cooperate with said teeth, levers fulcrumed upon said last named member and pivotally connected with the extensible ends of said linkages, said linkages and said levers forming symmetrically arranged sets, means associated with one of said members and having a plurality of links associated therewith, and means for connecting said links to a toggle linkage of one set and to a lever of the other set, whereby said toggle linkages will operate in unison and may be simultaneously moved to position said pawls in cooperative relationship with said teeth.

27. An overload release mechanism comprising a driving member, a driven member, a toggle linkage, and a yieldingly controlled lever operatively associated with said linkage, said linkage and said lever being arranged whereby an overload tripping movement increases the leverage of the linkage proportionately more than it increases the yielding pressure upon the lever.

28. In a mechanism of the character described, a driving member, a driven member, and an overload release driving connection therebetween comprising a toggle linkage, a lever associated with said linkage, and yielding means associated with said lever, said linkage and said lever being arranged whereby an overload between said driving and driven members straightens said linkage and moves said lever to compress said yielding means, the straightening of the linkage increasing the leverage of the linkage proportionately more than the movement of the lever increases the pressure of the yielding means.

29. An overload release mechanism comprising a driving member, a driven member, a pair of toggle linkages, a pair of yieldingly controlled levers associated with said linkages, and means for positioning said linkages and levers in the driving position from the released position, said means comprising a rotatable element associated with one of said members, links pivotally associated with said element, and a pair of links pivotally connected with each of said first mentioned links, one of the links of each pair of links being pivotally connected with a toggle linkage and the other link thereof being pivotally connected with a lever.

In testimony whereof, I hereunto affix my signature.

FREDERICK W. YOST.